US012688592B2

(12) United States Patent
Rapaport et al.

(10) Patent No.: US 12,688,592 B2
(45) Date of Patent: Jul. 21, 2026

(54) ZERO SHOT LOCALIZATION FOR AUTONOMOUS DRIVING

(71) Applicant: AUTOBRAINS TECHNOLOGIES LTD, Tel Aviv-Jaffa (IL)

(72) Inventors: Maya Rapaport, Tel Aviv-Jaffa (IL); Max Monastirsky, Tel Aviv-Jaffa (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 215 days.

(21) Appl. No.: 18/527,701

(22) Filed: Dec. 4, 2023

(65) Prior Publication Data

US 2025/0182299 A1    Jun. 5, 2025

(51) Int. Cl.
G06T 7/246 (2017.01)
G01C 21/30 (2006.01)

(52) U.S. Cl.
CPC .............. G06T 7/248 (2017.01); G01C 21/30 (2013.01); G06T 2207/10032 (2013.01); G06T 2207/20076 (2013.01)

(58) Field of Classification Search
None
See application file for complete search history.

(56) References Cited

U.S. PATENT DOCUMENTS 10,775,804 B1 * 9/2020 Eade .................... G05D 1/0253
2018/0188027 A1 * 7/2018 Zhang ...................... G06T 7/11

| | | | | |
|---|---|---|---|---|
| 2019/0337511 | A1 * | 11/2019 | Nguyen | B60W 30/0956 |
| 2022/0198700 | A1 * | 6/2022 | Lawlor | G01C 21/3848 |
| 2022/0307854 | A1 * | 9/2022 | Tesov | G01C 21/3602 |
| 2023/0129091 | A1 * | 4/2023 | Bajsarowicz | G01C 21/20 701/25 |
| 2023/0273029 | A1 * | 8/2023 | Filimonov | G06V 20/56 701/468 |
| 2024/0087146 | A1 * | 3/2024 | Rodrigues | G06N 20/00 |
| 2024/0096052 | A1 * | 3/2024 | Rodrigues | G06V 10/759 |
| 2024/0110799 | A1 * | 4/2024 | Beaurepaire | G01S 17/89 |
| 2024/0303860 | A1 * | 9/2024 | Mithun | G06T 7/74 |
| 2024/0328816 | A1 * | 10/2024 | Wang | G01C 21/30 |
| 2025/0065900 | A1 * | 2/2025 | Gideon | B60W 60/001 |
| 2025/0067574 | A1 * | 2/2025 | Ozog | G06V 20/56 |
| 2025/0095169 | A1 * | 3/2025 | Shi | G06T 7/33 |
| 2025/0139939 | A1 * | 5/2025 | Rodrigues | G06T 7/73 |

* cited by examiner

*Primary Examiner* — Tuyetlien T Tran
(74) *Attorney, Agent, or Firm* — RECHES PATENTS

(57) ABSTRACT

A method for determining a location of a vehicle includes obtaining, by a processor, a plurality of aerial image segment signatures of segments of a region including the vehicle, and a plurality of sensed image signatures associated with the region including the vehicle. The method matches a selected aerial image segment signature segment signatures to a selected sensed image signature. Based on the matching step, the processor generates probabilistic location information regarding the location of the vehicle. The method also includes generating a movement estimate of the vehicles. The movement estimate is generated based on a vehicle location comparison across a plurality of vehicle sensed images, and the plurality of vehicle sensed images are captured at a plurality of time intervals. The method also includes determining the location of the vehicle by combining the movement estimate of the vehicle and the probabilistic location information.

23 Claims, 15 Drawing Sheets

Air2Road
Localization
Initial fusion results

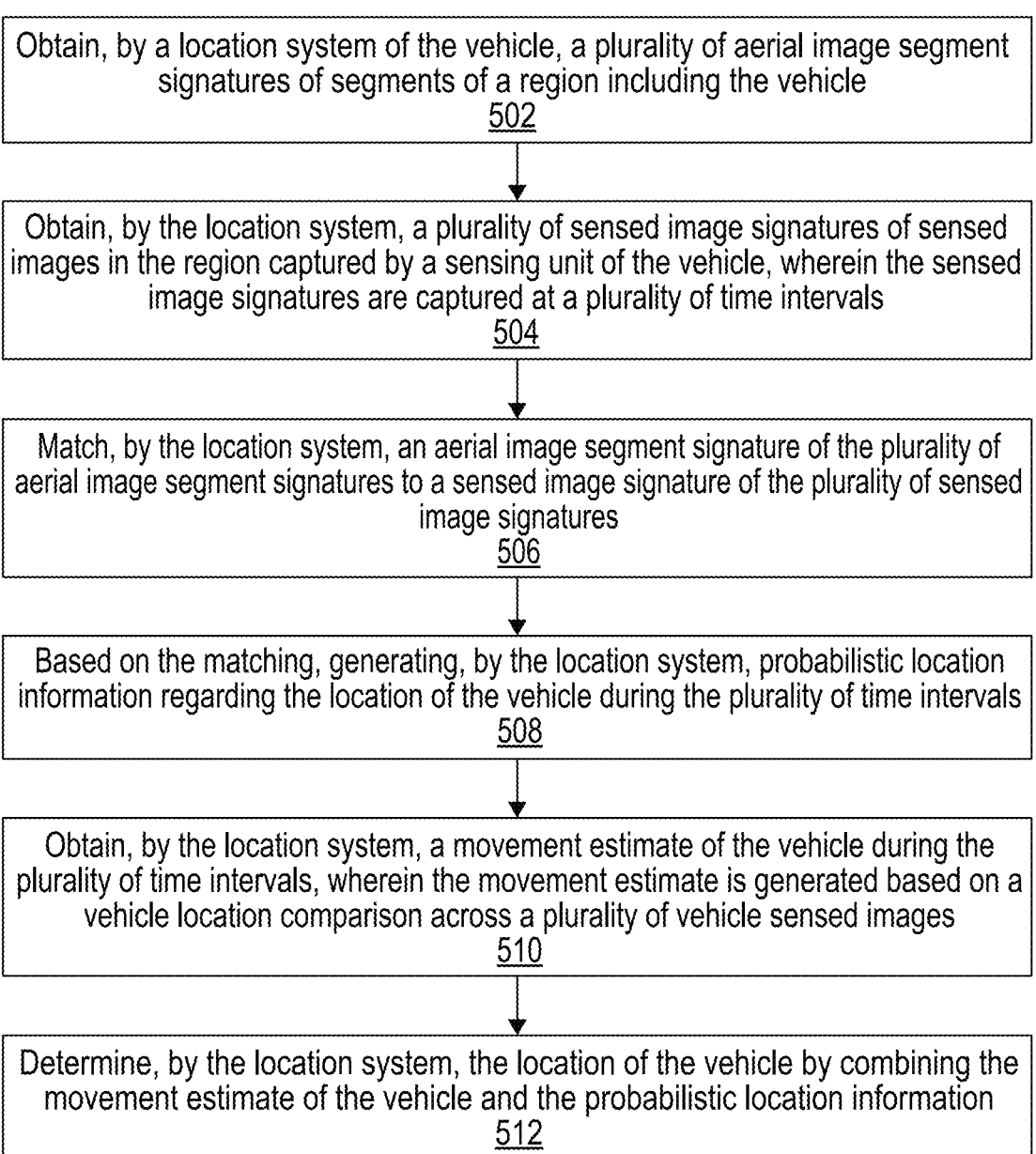

500

Obtain, by a location system of the vehicle, a plurality of aerial image segment signatures of segments of a region including the vehicle
502

Obtain, by the location system, a plurality of sensed image signatures of sensed images in the region captured by a sensing unit of the vehicle, wherein the sensed image signatures are captured at a plurality of time intervals
504

Match, by the location system, an aerial image segment signature of the plurality of aerial image segment signatures to a sensed image signature of the plurality of sensed image signatures
506

Based on the matching, generating, by the location system, probabilistic location information regarding the location of the vehicle during the plurality of time intervals
508

Obtain, by the location system, a movement estimate of the vehicle during the plurality of time intervals, wherein the movement estimate is generated based on a vehicle location comparison across a plurality of vehicle sensed images
510

Determine, by the location system, the location of the vehicle by combining the movement estimate of the vehicle and the probabilistic location information
512

FIG. 5

ZERO SHOT LOCALIZATION FOR AUTONOMOUS DRIVING

BACKGROUND

Vehicle environment information is critical for systems relating to the autonomous driving of ground autonomous vehicles (AVs). Such vehicle environment information may include, for example, the location of the ground vehicle, which is used for planning a next driving operation of the ground vehicle, for navigating the ground vehicle, for determining applicable driving laws, and the like.

The location of the ground vehicle should be accurate, should be updated frequently, should be easily accessible by an AV system of the ground vehicle, and should be highly secure.

Current localization solutions rely on maps produced, for example, by ground image capture, and city/street planning information. These maps may be constantly updated based on inputs provided by multiple ground vehicles. These solutions require that the locations determined using the high-definition map be driven by many ground vehicles, and in some instances, only by the same type of ground vehicle. These solutions also depend on the existence of predetermined landmarks at the current location of the ground vehicle, and some locations may not be associated with these landmarks.

There is a growing need to provide an accurate and efficient method for locating the ground vehicle without having a predetermined high-definition map that includes landmarks identified from images sensed by other ground vehicles.

SUMMARY

There is provided a method that is computer implemented and is for determining a location of a vehicle. The method includes (i) obtaining, by a processor, a plurality of aerial image segment signatures of segments of a region including the vehicle; (ii) obtaining, by the processor, a plurality of sensed image signatures associated with the region including the vehicle; (iii) matching, by the processor, a selected aerial image segment signature of the plurality of aerial image segment signatures to a selected sensed image signature of the plurality of sensed image signatures; (iv) based on the matching step, generating, by the processor, probabilistic location information regarding the location of the vehicle; (v) generating, by the processor, a movement estimate of the vehicles, wherein the movement estimate is generated based on a vehicle location comparison across a plurality of vehicle sensed images, wherein the plurality of vehicle sensed images are captured at a plurality of time intervals; and (vi) determining, by the processor, the location of the vehicle by combining the movement estimate of the vehicle and the probabilistic location information.

There is provided a non-transitory computer readable medium for determining a location of a vehicle. The non-transitory computer readable medium stores instructions that once executed by a location system of the vehicle cause the location system to: (i) obtain a plurality of aerial image segment signatures of segments of a region including the vehicle; (ii) obtain a plurality of sensed image signatures associated with the region including the vehicle; (iii) match a selected aerial image segment signature of the plurality of aerial image segment signatures to a selected sensed image signature of the plurality of sensed image signatures; (iv) based on the matching step, generate probabilistic location information regarding the location of the vehicle; generate a movement estimate of the vehicles, wherein the movement estimate is generated based on a vehicle location comparison across a plurality of vehicle sensed images, wherein the plurality of vehicle sensed images are captured at a plurality of time intervals; and (v) determine the location of the vehicle by combining the movement estimate of the vehicle and the probabilistic location information.

There is provided a location system of a vehicle, the location system comprising: one or more processing circuits that comprise at least a part of an integrated circuit, the one or more processing circuits are configured to: (i) obtain a plurality of aerial image segment signatures of segments of a region including the vehicle; (ii) obtain a plurality of sensed image signatures associated with the region including the vehicle; (iii) match a selected aerial image segment signature of the plurality of aerial image segment signatures to a selected sensed image signature of the plurality of sensed image signatures; (iv) based on the matching step, generate probabilistic location information regarding the location of the vehicle; (v) generate a movement estimate of the vehicles, wherein the movement estimate is generated based on a vehicle location comparison across a plurality of vehicle sensed images, wherein the plurality of vehicle sensed images are captured at a plurality of time intervals; and (vi) determine the location of the vehicle by combining the movement estimate of the vehicle and the probabilistic location information.

BRIEF DESCRIPTION OF THE DRAWINGS

The embodiments of the disclosure will be understood and appreciated more fully from the following detailed description, taken in conjunction with the drawings in which:

FIG. 5 is a flow diagram of a method for determining a vehicle location according to embodiments of the disclosure;

DETAILED DESCRIPTION

Figure 1A:
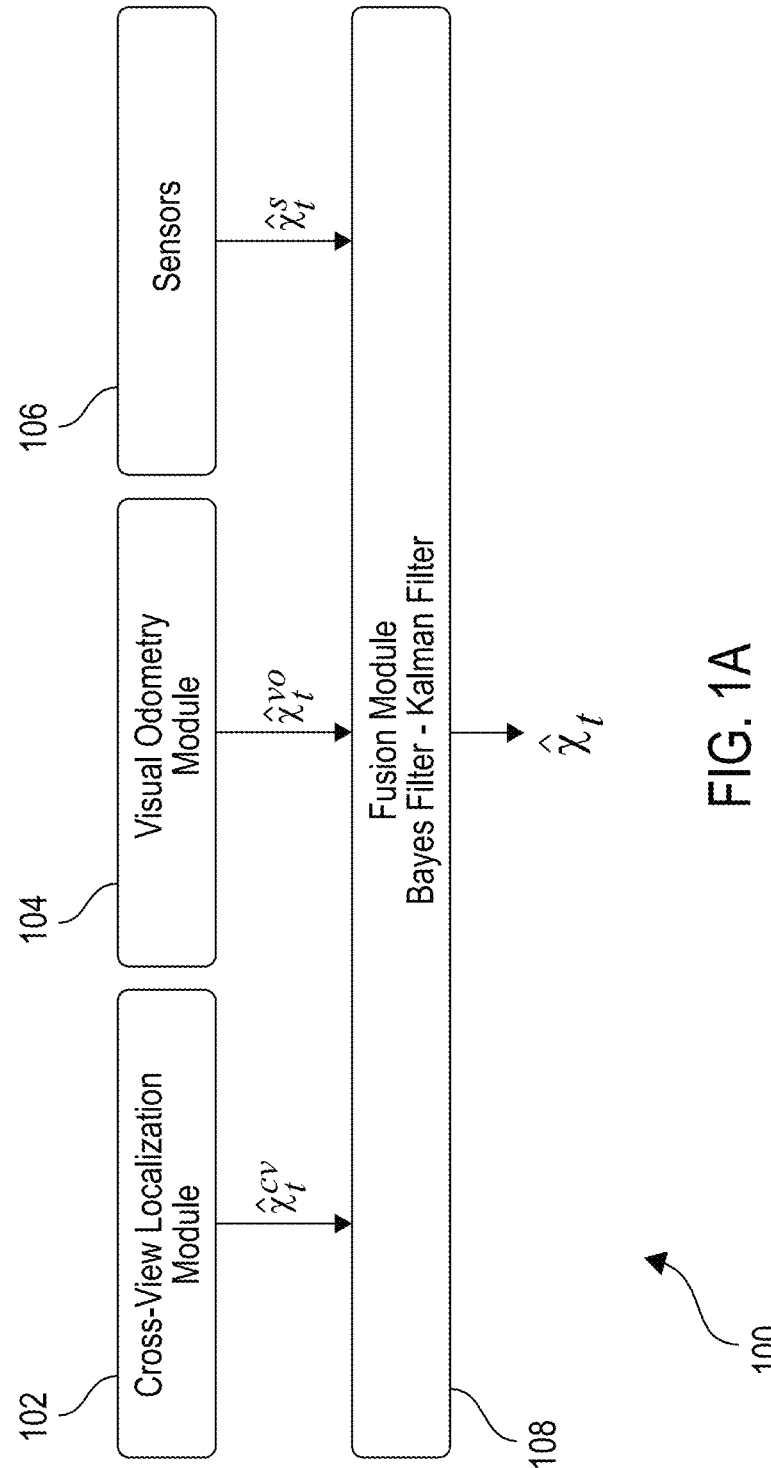
FIGS. 1A-1C are schematic diagrams of a system for determining a vehicle location and system components according to embodiments of the disclosure.

There is provided a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

There is provided a method for determining a location of a vehicle. The method also includes obtaining, by a processor, a plurality of aerial image segment signatures of segments of a region including the vehicle. The method also includes obtaining, by the processor, a plurality of sensed image signatures associated with the region including the vehicle. The method also includes matching, by the processor, a selected aerial image segment signature of the plurality of aerial image segment signatures to a selected sensed image signature of the plurality of sensed image signatures. The method also includes based on the matching step, generating, by the processor, probabilistic location information regarding the location of the vehicle. The method also includes generating, by the processor, a movement estimate of the vehicles, where the movement estimate is generated based on a vehicle location comparison across a plurality of vehicle sensed images, where the plurality of vehicle sensed images are captured at a plurality of time intervals. The method also includes determining, by the processor, the location of the vehicle by combining the movement estimate of the vehicle and the probabilistic location information. Other embodiments of this aspect include corresponding computer systems, apparatus, and computer programs recorded on one or more computer storage devices, each configured to perform the actions of the methods.

There is provided a non-transitory computer readable medium for determining a location of a vehicle. The non-transitory computer readable medium also stores instructions for obtaining a plurality of aerial image segment signatures of segments of a region including the vehicle. The medium also stores instructions for obtaining a plurality of sensed image signatures associated with the region including the vehicle. The medium also stores instructions for matching a selected aerial image segment signature of the plurality of aerial image segment signatures to a selected sensed image signature of the plurality of sensed image signatures. The medium also stores instructions for generating, based on the matching step, probabilistic location information regarding the location of the vehicle. The medium also stores instructions for generating a movement estimate of the vehicles, where the movement estimate is generated based on a vehicle location comparison across a plurality of vehicle sensed images, where the plurality of vehicle sensed images are captured at a plurality of time intervals. The medium also stores instructions for determining the location of the vehicle by combining the movement estimate of the vehicle and the probabilistic location information. Other embodiments of this aspect include corresponding computer systems, apparatus, and computer programs recorded on one or more computer storage devices, each configured to perform the actions of the methods.

One general aspect includes a location system of a vehicle. The location system also includes one or more processing circuits that may include at least a part of an integrated circuit. The system is also configured to obtain a plurality of aerial image segment signatures of segments of a region including the vehicle. The system is also configured to obtain a plurality of sensed image signatures associated with the region including the vehicle. The system is also configured to match a selected aerial image segment signature of the plurality of aerial image segment signatures to a selected sensed image signature of the plurality of sensed image signatures. The system is also configured to, generate based on the matching step, probabilistic location information regarding the location of the vehicle. The system is also configured to generate a movement estimate of the vehicles, where the movement estimate is generated based on a vehicle location comparison across a plurality of vehicle sensed images, where the plurality of vehicle sensed images are captured at a plurality of time intervals. The system is also configured to determine the location of the vehicle by combining the movement estimate of the vehicle and the probabilistic location information. Other embodiments of this aspect include corresponding computer systems, apparatus, and computer programs recorded on one or more computer storage devices, each configured to perform the actions of the methods.

According to embodiments of the disclosure, systems, non-transitory computer readable medium, and methods for determining a location of a vehicle are provided. According to embodiments of the disclosure, the systems, non-transitory computer readable medium and methods do not rely on predetermined high-definition maps that include landmarks identified from images sensed by other ground vehicles, or other previously acquired location information. Instead, location information is gathered in real-time from at least two sources and combined to provide highly accurate vehicle location information while the vehicle is in motion.

Figure 1B:
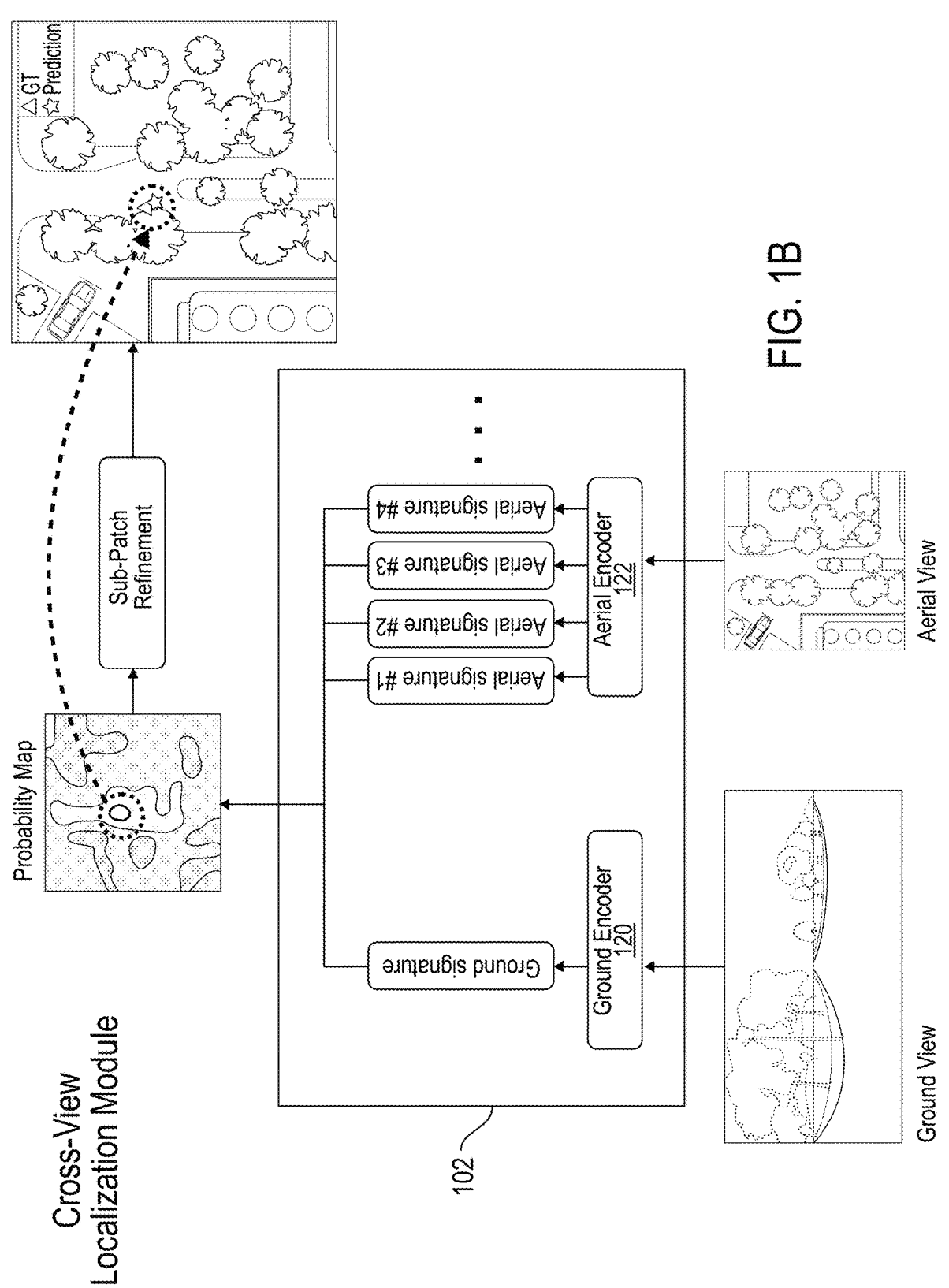
Figure 1C:
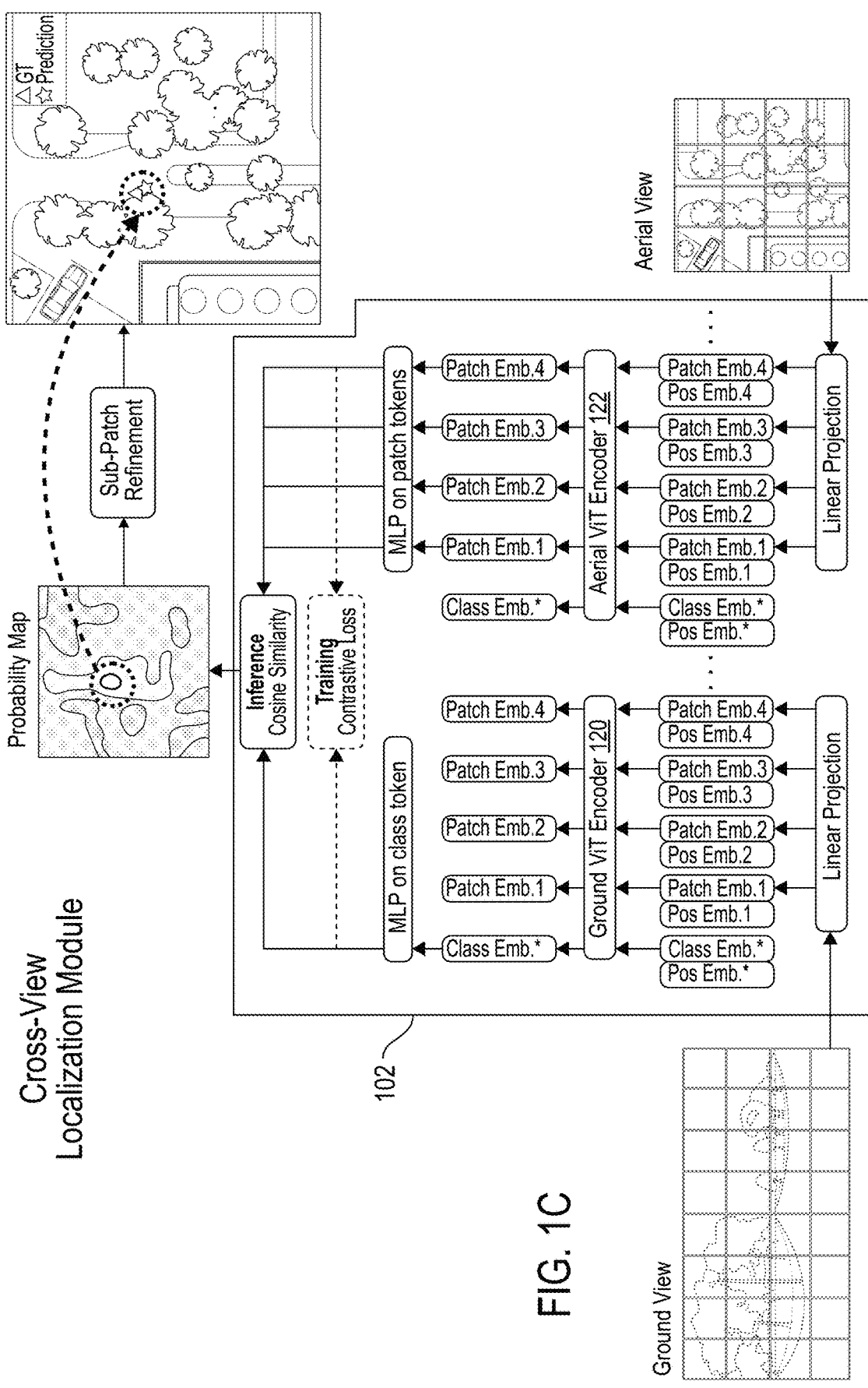

Referring now to the drawings, FIGS. 1A-1C are schematic diagrams of a system 100 for determining a vehicle location according to embodiments of the disclosure. As shown in FIG. 1A, the system 100 may include a cross-view localization module 102, a visual odometry module 104, a sensor module 106, and a fusion module 108.

Inputs into the system 100, or one or more system components, may include aerial images 216, aerial image segment signatures 218, vehicle sensed images 220 (at least some of which are acquired at different points in time), vehicle sensed image signatures 222, movement estimates 224, motion information 226, and a probabilistic location information 228, each of which shall be discussed in greater detail herein. For instance, inputs may include an image from the vehicle (for example, a 360-degree surround view image taken by a front camera of the vehicle), a satellite image, a GPS signal, and any additional information such as velocity from controller area network (CAN) signals and/or an inertial measurement unit (IMU).

Inputs may be processed by the cross-view localization module 102. FIG. 1B is a schematic diagram of the cross-view localization module 102 of FIG. 1A. The cross-view localization module 102 is configured to obtain a plurality of sensed images from, for example, a sensing unit of the vehicle and is further configured to receive a plurality of aerial images or image segments from, for example a satellite feed.

As is further illustrated in FIG. 1B, the cross-view localization module 102 is configured to obtain a plurality of aerial images or aerial image segments. According to embodiments of the disclosure, the cross-view localization module 102 may be configured to receive a plurality of aerial images or image segments of a region in which the vehicle is located. To this end, the cross-view localization module 102 is configured to receive a plurality of inputs from one or more outside-the-vehicle sources. Outside-the-vehicle sources may include satellite images or GPS location information.

A coverage area (i.e., a specified image capture area) for a captured aerial image segment may be determined. The required coverage area of a specified image capture area may be determined in advance or in a dynamic manner. For example, if the ground vehicle is located in an urban area, or another area that exhibits a high density of objects, then the aerial image coverage area may be reduced. Alternatively, if the ground vehicle is located in a rural, desolate, isolated or other area only sparsely populated with objects, then the aerial image coverage area may be increased. Modifications to the coverage area may be assisted by coarse location information of the ground vehicle. Such coarse location information may be received from, for example, by as a global positioning satellite (GPS) system, a cellular location system, and the like.

Figure 2:
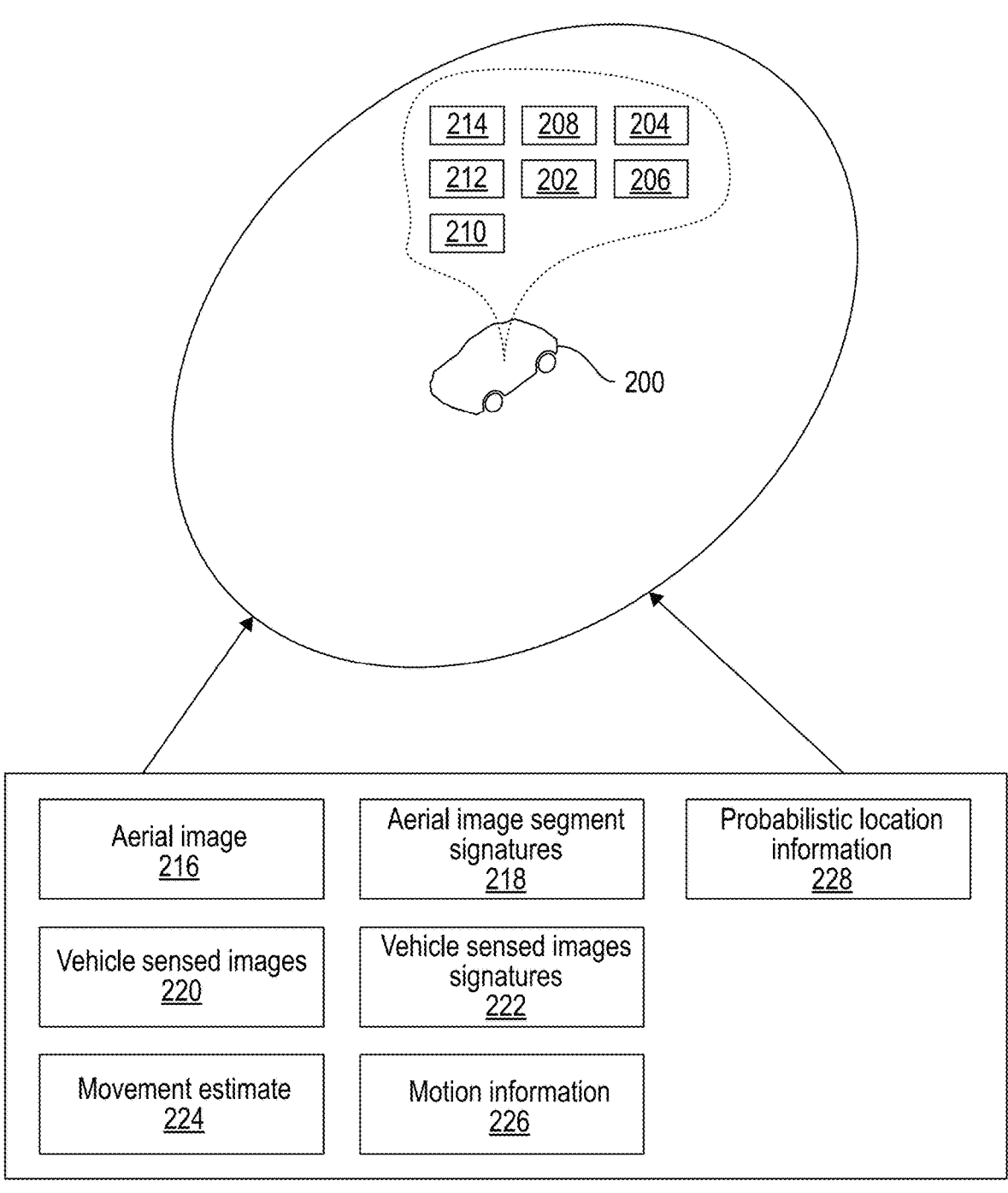
FIG. 2 illustrates a ground vehicle and a plurality of vehicle sensors present in the ground vehicle.

The cross-view localization module 102 is further configured to receive a plurality of sensed images. To this end, the system 100 is configured to receive a plurality of sensed inputs from one or more in-vehicle sources. FIG. 2 illustrates a ground vehicle 200 including a plurality of components. According to embodiments of the disclosure, a ground vehicle 200 including the location system 100 as described herein may include a vehicle sensing unit 202 that further includes one or more sensors such as vehicle sensors 204 and 206. The vehicle sensors 204, 206 may include multiple image sensors and one or more non-image sensors. The vehicle sensors 204, 206 may be image capture devices (such as cameras), audio sensors, infrared sensors, radar, ultrasound sensors, electro-optics sensors, radiography sensors, Lidar (light detection and ranging) sensors, thermal sensor sensors, passive sensors, active sensors, etc. The plurality of sensed images may be received at a plurality of time intervals.

The ground vehicle 200 may also include one or more processing circuits 208, memory unit 210, communication unit 212, and one or more vehicle units 214 such as one or more vehicle computers, units controlled by the one or more vehicle units, motor units, chassis, wheels, and the like. The one or more processing circuits 208 are configured to execute the systems and methods disclosed herein.

According to an embodiment, the ground vehicle sensed images are 360-degree ground vehicle sensed images. In this instance, each ground vehicle sensed image covers a 360-degree sample of the environment of the ground vehicle. According to an embodiment, the ground vehicle sensed images cover less than 360 degrees. Including a broader coverage area in the ground vehicle sensed image may increase the accuracy of the location detection. Including a narrower coverage area in the ground vehicle sensed image may require less bandwidth and may therefore be less expensive to execute.

According to an embodiment, a sensed image is generated by acquiring a plurality of ground vehicle sensed images. The ground vehicle sensed images may be of different angular segments of a vehicle's field of view. The different angular segments may be acquired by different image sensors having different fields of views (differ by at least by their polar angle coverage), and/or may be acquired by scanning the environment of the ground vehicle—for example using movable image sensors or image sensors preceded by optics of an adjustable field of view. The plurality of ground vehicle sensed images may be captured in close-timing proximity (e.g., within a fraction of a second from each other). The plurality of ground vehicle sensed images, or at least a portion of the visual information contained therein, may then be stitched or otherwise combined to provide a 360-degree ground vehicle sensed images.

The sensed images and aerial images may be translated into image signatures, by for example, a processor (e.g., the cross-view localization module 102). An image signature of a detected region (e.g., a ground vehicle-sensed image or an aerial image) may be defined as information regarding one or more other regions of the image.

To generate the image signatures from sensed images and/or aerial images or image segments, the cross-view localization module 102 may include a ground encoder 120 and an aerial encoder 122. The ground encoder 120 is configured to extract a sensed image signature (e.g., a ground-vehicle image signature) from an image captured by a vehicle sensor. The sensed image signature contains ground image information of a captured image segment that is needed to perform a comparison between the image segment and at least one additional input (e.g., a satellite image). A plurality of sensed image signatures may be obtained at a plurality of time intervals.

The aerial encoder 122 extracts a plurality of aerial image signatures from, for example, received satellite images. Aerial image segment signatures are composed of information relating to aerial image segments of a region in which a vehicle may be located (i.e., the specified image capture area). Each aerial image signature includes information regarding the selected specified image capture area. Signatures of an aerial segment or a subsegment of an aerial segment (e.g., a segment patch) may be generated by applying a self-attention mechanism to the segment or the segment patch. A self-attention mechanism may be a mechanism that computes attention scores between patches, based, for example, on the content and position of an object in the image. The self-attention mechanism may be included in a transformer neural network.

The cross-view localization module 102 is also configured to match an aerial image segment signature of the plurality of aerial image segment signatures to a sensed image signature of the plurality of sensed image signatures. As shown in FIG. 1C, a process for matching a sensed (ground) image signature to an aerial image signature is shown. Prior to input into the cross-view localization module 102, the ground view image and the aerial image may be divided into one or more sections or a grid. Once an image is input into the cross-view localization module 102, in, for instance, a grid formed from individual image segments, a linear projection of the one or more grid segments may be calculated. A ground view image class embedding and position embedding, as well as a plurality of ground position and patch embeddings may be created from the linear projection. Similarly, an aerial image class and position embedding, and a plurality of aerial position and patch embeddings may be created from the linear projection.

The respective class/position embeddings and position/patch embeddings may be fed into the ground encoder 120 and the aerial encoder 122, respectively. In such instances, the ground encoder 120 and the aerial encoder 122 may be Vision Transformer (ViT) encoders or may leverage another like deep learning architecture. The output of the ground encoder 120 may be a ground image class token and a plurality of ground image patch tokens. The output of the aerial encoder 122 may be an aerial image class token and a plurality of aerial image patch tokens. A multi-layer perceptron function may be performed on the ground encoder class token and the plurality of aerial patch tokens.

The system is trained with attention mechanisms to locate the best representations and matching between aerial image signatures and sensed image signatures. For instance, the cross-view localization module 102 may apply a contrastive loss function to the input tokens. In such instances, the training process may include feeding the machine learning process with ground vehicle sensed images at different points in time and corresponding aerial images. The training process may cause the machine learning process to provide a mapping between the vehicle sensed image signatures and the aerial image segment signatures. The training process may also induce training the machine learning process to (i) provide a similar signature to a ground vehicle sensed image of a region and an aerial image segment signature of that region, and (ii) provide dissimilar signatures to a ground vehicle sensed image and an aerial image segment of different regions. In some instances, the training process relies on a neural network such as an attention mechanism. Other functions configured to determine how well a model can differentiate between similar and dissimilar data points may be utilized.

During an inference phase, a cosine similarity function may be applied. Other functions configured to a measure of similarity between two non-zero vectors defined in an inner product space may be utilized.

Probabilistic location information is then generated from the processing steps performed by the cross-view localization module 102. For instance, the cross-view localization module 102 is further configured to generate probabilistic location information (e.g., a probability map) regarding the location of the vehicle during the plurality of time intervals. The probabilistic location information is based on the matching of the aerial image segment signature and the sensed image signature. For example, the sensed image signature and the aerial image signature are compared against each other to create probabilistic location information. As mentioned above, the aerial image signatures input into the cross-view localization module 102 may be constructed during training such that they contain relevant data from other patches of the satellite image. This may be executed by utilizing a self-attention mechanism, i.e., a mechanism that computes attention scored between patches, based, for example, on content and position in the image. Determining a probabilistic location of the ground vehicle includes determining the location information at a sub-patch resolution. A sub-patch refinement module may be applied to accurately estimate the location of the camera in the satellite image. For instance, with respect to a received satellite patch, one or more satellite patch neighbors may be fused to indicate where inside the patch the location probability is the highest. Alternatively, up-sampling (i.e., using an up-sampled version of the aerial image) may be utilized on the satellite image.

According to an embodiment, the probabilistic location information is a heatmap. A color of a heatmap pixel is indicative of a probability that the vehicle is located at the heatmap pixel. For instance, a high concentration of red pixels may indicate a high location probability.

Figure 3A:
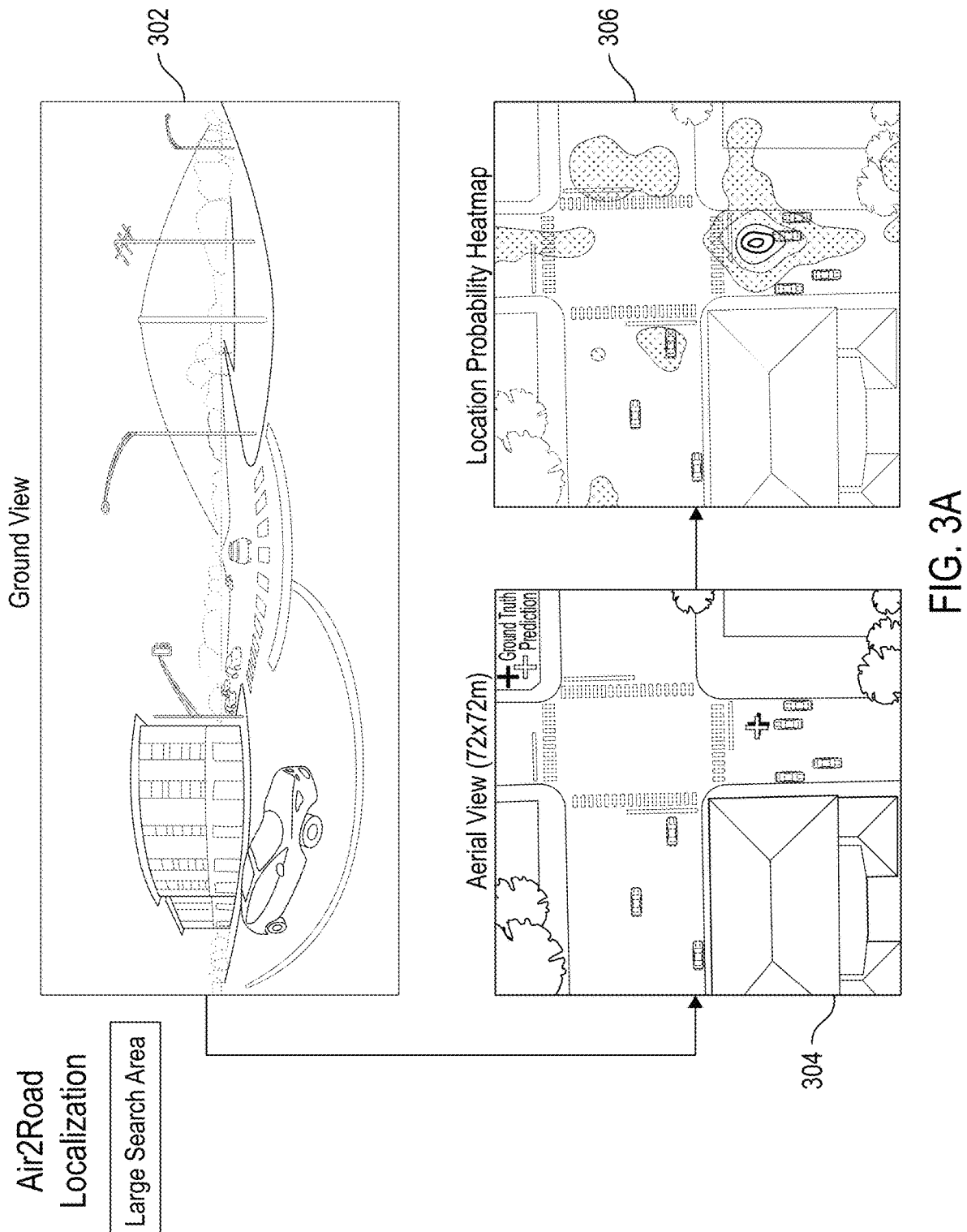
FIGS. 3A-3G illustrate examples of an aerial image segments, a vehicle image segments, and corresponding heatmaps according to embodiments of the disclosure.
Figure 3B:
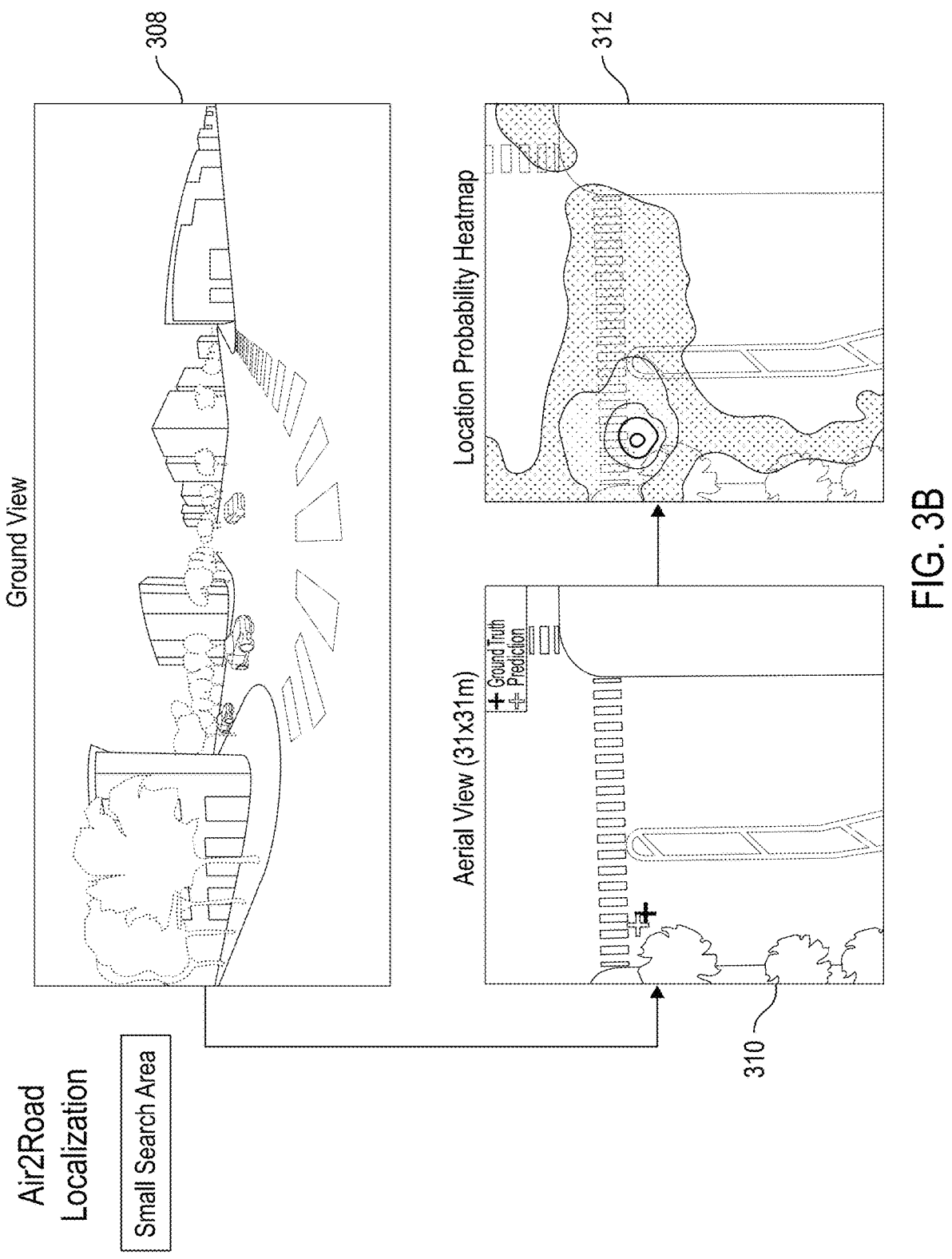
Figure 3C:
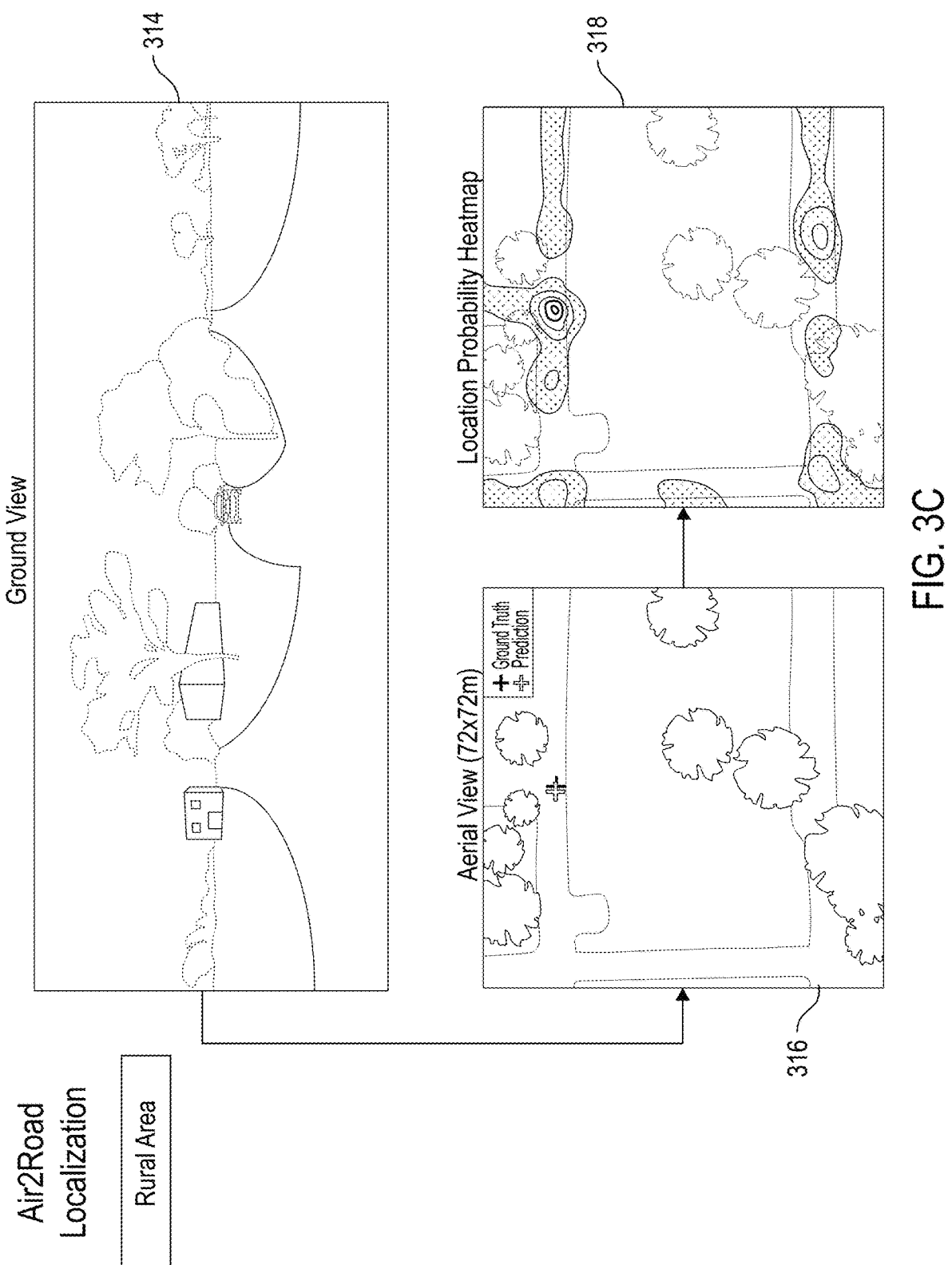
Figure 3D:
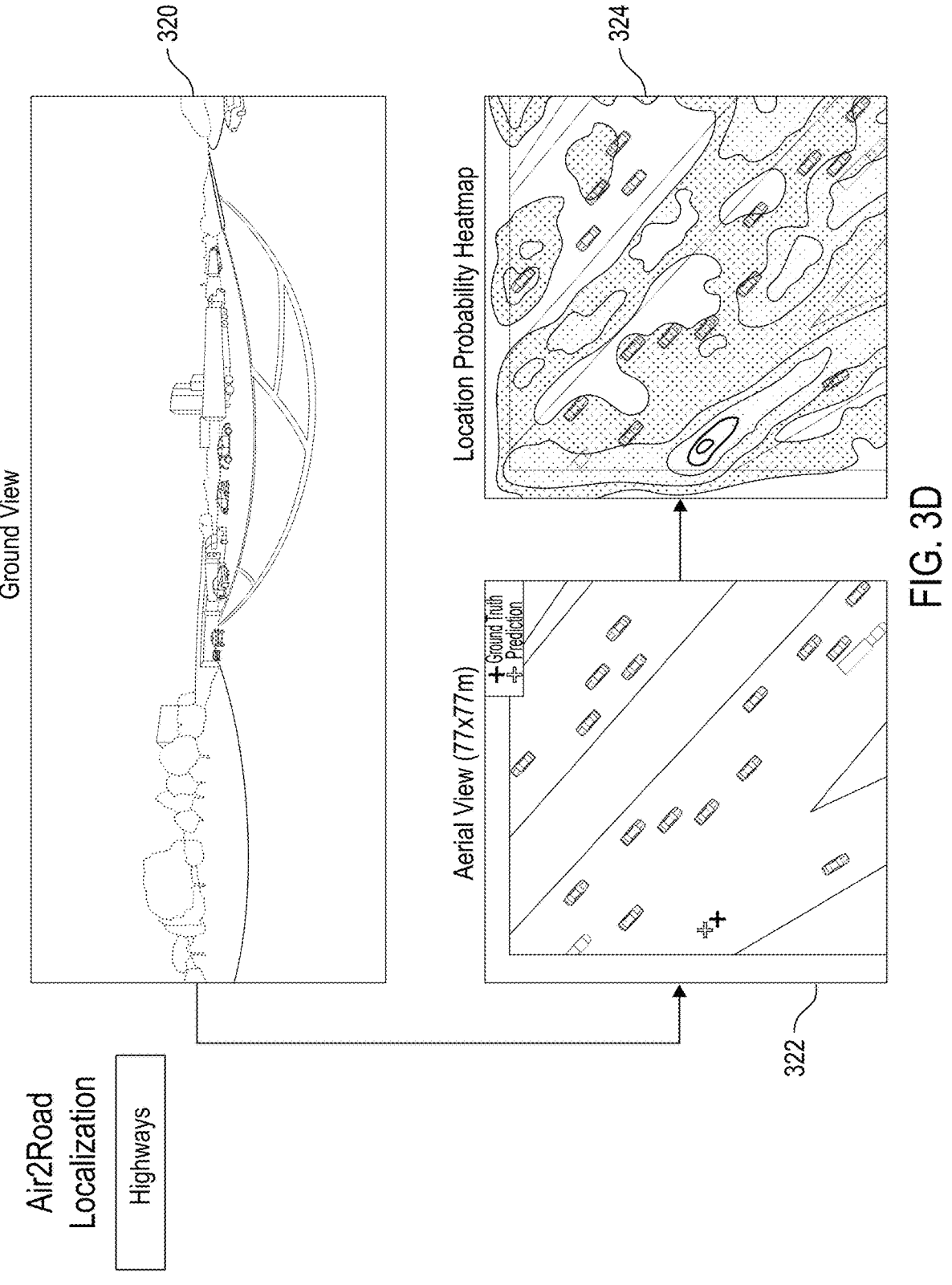
Figure 3E:
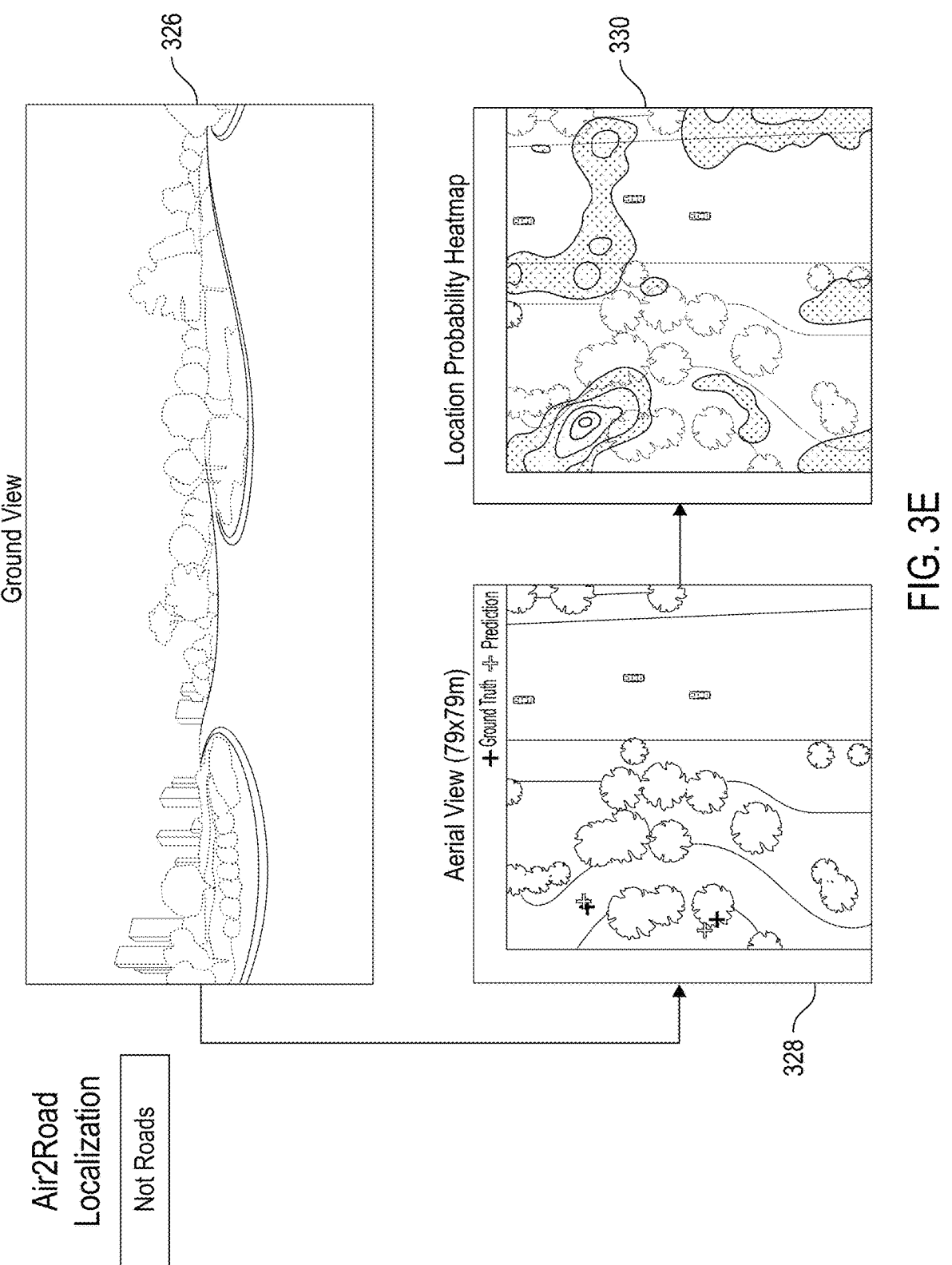
Figure 3F:
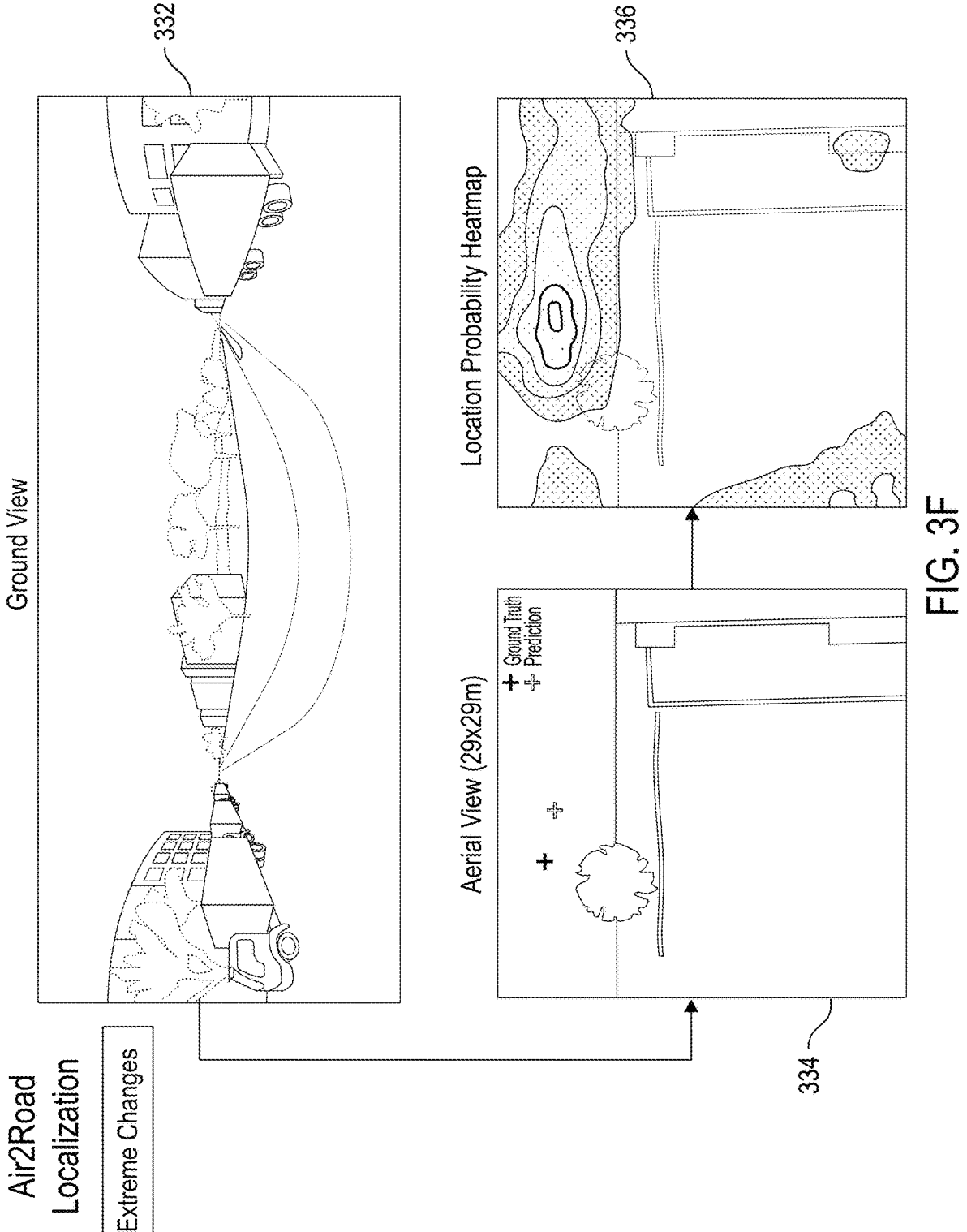
Figure 3G:
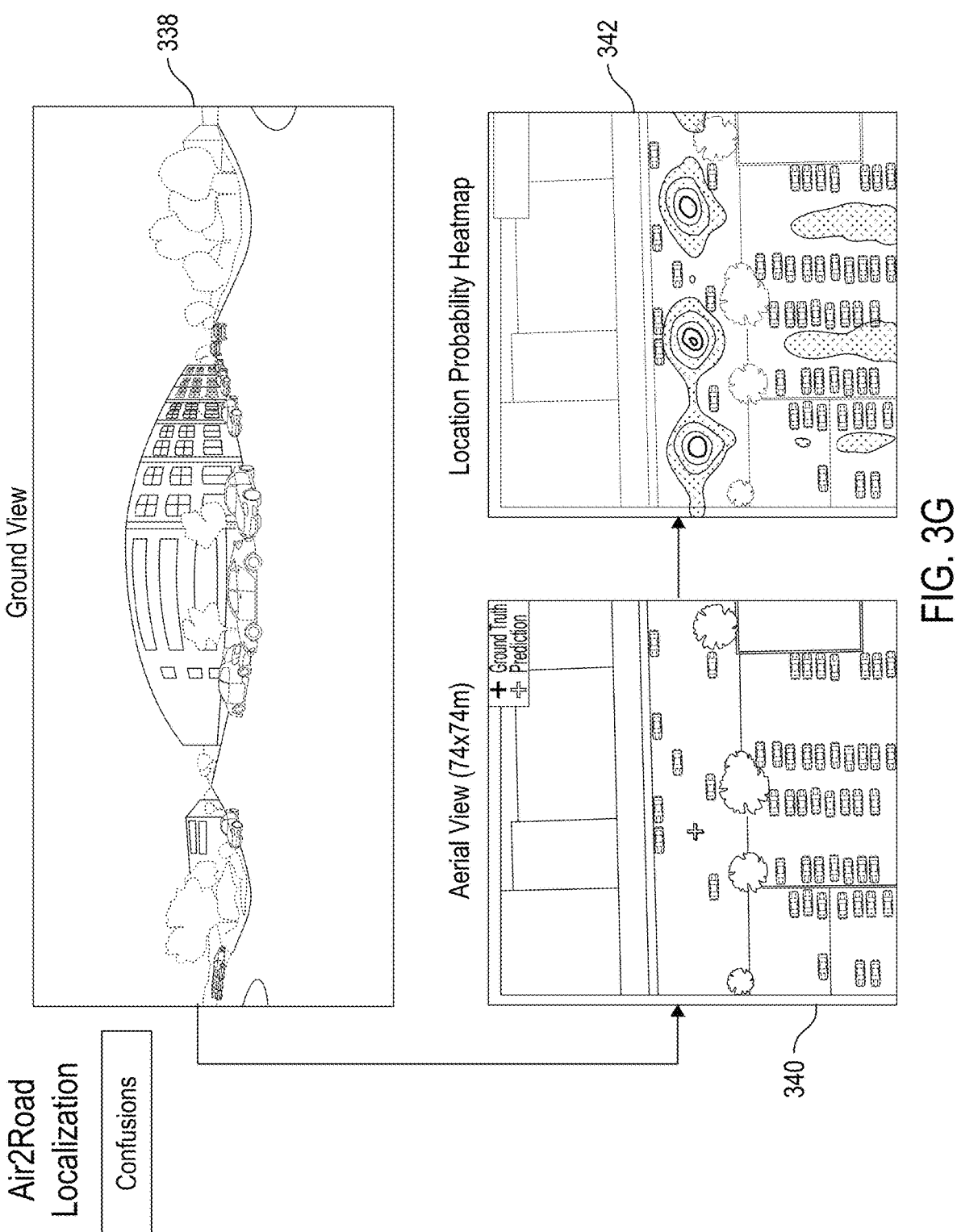

FIGS. 3A-3H illustrate examples of an aerial image segments, a vehicle image segments, and corresponding heatmaps according to embodiments of the disclosure. The system 100 is configured to adapt to any number of driving scenarios. Modifications to the sensed and aerial image inputs may be made based on the environment as determined by one or more onboard vehicle sensors. FIG. 3A illustrates an example of a vehicle image segment 302, an aerial image segment 304, and corresponding heatmap 306 for a vehicle in a large search area. For example, a large search area may be defined as approximately 74 m×74 m or greater. FIG. 3B illustrates an example of a vehicle image segment 308, an aerial image segment 310, and corresponding heatmap 312 for a vehicle in a small search area. For example, a small search area may be defined as approximately 29 m×29 m or greater. FIG. 3C illustrates an example of a vehicle image segment 314, an aerial image segment 316, and corresponding heatmap 318 for a vehicle in a rural area. FIG. 3D illustrates an example of a vehicle image segment 320, an aerial image segment 322, and corresponding heatmap 324 for a vehicle in a highway scenario. FIG. 3E illustrates an example of a vehicle image segment 326, an aerial image segment 328, and corresponding heatmap 330 for a vehicle in a side-road scenario. FIG. 3F illustrates an example of a vehicle image segment 332, an aerial image segment 334, and corresponding heatmap 336 for a vehicle in a scenario involving an extreme change in vehicle direction. FIG. 3G illustrates an example of a vehicle image segment 302, an aerial image segment 304, and corresponding heatmap 306 for a vehicle in a large search area.

The system is further configured to obtain a movement estimate of the vehicle during the plurality of time intervals. In some embodiments, the movement estimate may be obtained from the visual odometry module 104. For example, the visual odometry module 104 may be configured to analyze a plurality of sensed images received from a vehicle sensor (e.g., one or more of sensors 204, 206). The movement estimate is generated based on a vehicle location comparison across the plurality of sensed images. For instance, the visual odometry module 104 may detect an object in a first received image. The visual odometry module 104 may then search for the object in subsequent images and calculate or estimate vehicle movement information from the differences in position of the detected object. The object may be stationary to allow for a comparison of the vehicle in motion to the object at discrete time intervals. In some embodiments, velocity information may be extracted from controller area network (CAN) signals. The visual odometry module 104 may then use the received inputs to update vehicle location as the vehicle traverses a path.

According to an embodiment, motion information may be gained from non-image sensors of the ground vehicle. The system may further comprise a sensor module 106 configured to receive inputs from a plurality of sensors (examples of which are described above in FIG. 2). The motion information may therefore be obtained by at least one sensor, such as a vehicle direction or propagation sensor (e.g., a sensor configured to determine the direction of propagation of the vehicle), an accelerometer, and the like. Sensor module information may be combined with the cross-view localization module output and/or the visual odometry output.

Figure 4:
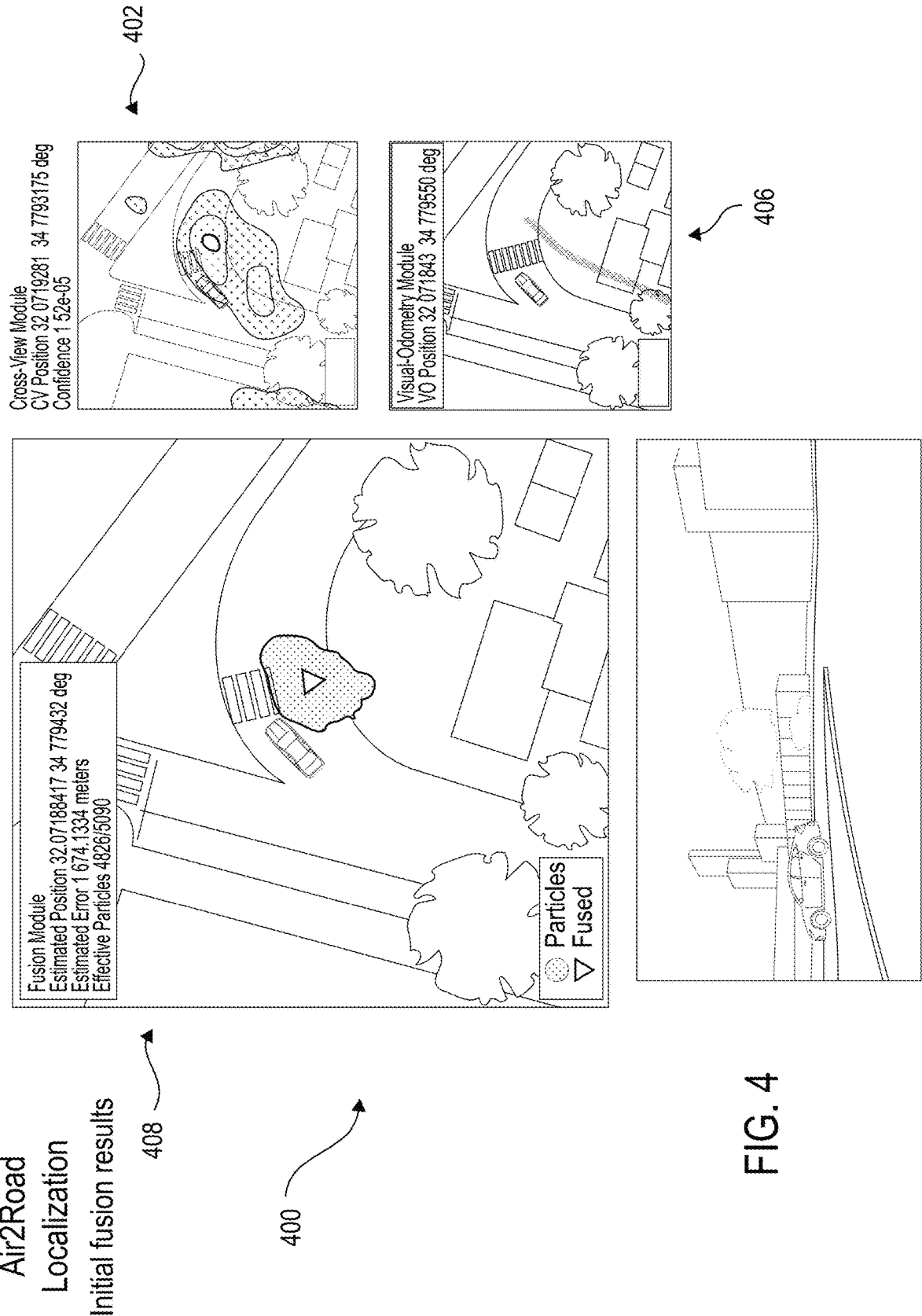
FIG. 4 illustrates an example of an initial fusion result according to embodiments of the disclosure.

The system 100 is further configured to determine the location of the vehicle by fusing or combining the movement estimate of the vehicle and the probabilistic location information. For instance, the fusion module 108 may combine or fuse input location information. The fusion module 108 may be a particle filter, such as a Bayes filter or a Kalman filter. FIG. 4 illustrates initial fusion results, whereby a heatmap 402 from the cross-view localization module 102 and movement information 404 from the visual odometry module are fused or combined to form a fusion module depiction 406 of a vehicle location. Determining the location of the ground vehicle may be based on, or solely on, a combination or fusing of the movement estimate of the ground vehicle, the probabilistic location information and coarse ground vehicle location information. Alternatively, determining the location of the ground vehicle may be based on, or solely on, a combination or fusing of the movement estimate of the ground vehicle, the probabilistic location information and motion information gained from non-image sensors of the ground vehicle. Determining the location of the ground vehicle may be based on, or solely on, a combination or fusing of the movement estimate of the ground vehicle, the probabilistic location information, motion information gained from non-image sensors of the ground vehicle and coarse ground vehicle location information.

According to an embodiment, the fusing is executed by a machine learning process of the fusion module, the machine learning process has undergone a training process in which it learns to fuse outputs from the cross-view localization module and the visual odometry module.

Determining the location of the ground vehicle may further include triggering a determination of an autonomous driving operation. Thus, the determining the location of the ground vehicle may further include determining the autonomous driving operation, and/or executing the autonomous driving operation. According to embodiments of the disclosure, the autonomous driving operation includes at least one of autonomously controlling a speed and/or direction of propagation and/or acceleration of a vehicle. The autonomous driving operation may also be an emergency breaking operation, a lane maintaining driving operation, a lane changing driving operation, and the like.

A resultant location indication may be accurate to a sub-10 cm offset. The system is able to perform vehicle localization in any location without the need for the particular road to have been driven by the vehicle previously. The system 100 may be configured to execute offline, by leveraging highly compressed aerial image signatures stored in the system.

FIG. 5 illustrates an example of a method 500 for determining a location of a ground vehicle. The method may be executed by the system 100, or any components thereof e.g., the cross-view module 102, the visual odometry module 104, the sensor module 106, and the fusion module 108 of the system 100 as described herein. The method 500 includes obtaining 502, by a processor, a plurality of aerial image segment signatures of segments of a region including the vehicle. The method also includes obtaining 504, by the processor, a plurality of sensed image signatures associated with the region including the vehicle. The method also includes matching 506, by the processor, a selected aerial image segment signature of the plurality of aerial image segment signatures to a selected sensed image signature of the plurality of sensed image signatures. The method further includes, based on the matching, generating 508, generating, by the processor, probabilistic location information regarding the location of the vehicle. According to an embodiment, the generating of the probabilistic location information comprises applying a random sample consensus process. The probabilistic location information may be generated per pixel (i.e., is pixelwise) or per a group of any number of pixels. The probabilistic location information is a heatmap. A color of a heatmap pixel is indicative of a probability that the vehicle is located at the heatmap pixel.

The method further includes generating 510, by the processor, a movement estimate of the vehicles, wherein the movement estimate is generated based on a vehicle location comparison across a plurality of vehicle sensed images, wherein the plurality of vehicle sensed images are captured at a plurality of time intervals. The method also includes determining 512, by the processor, the location of the vehicle by combining the movement estimate of the vehicle and the probabilistic location information.

Figure 6:
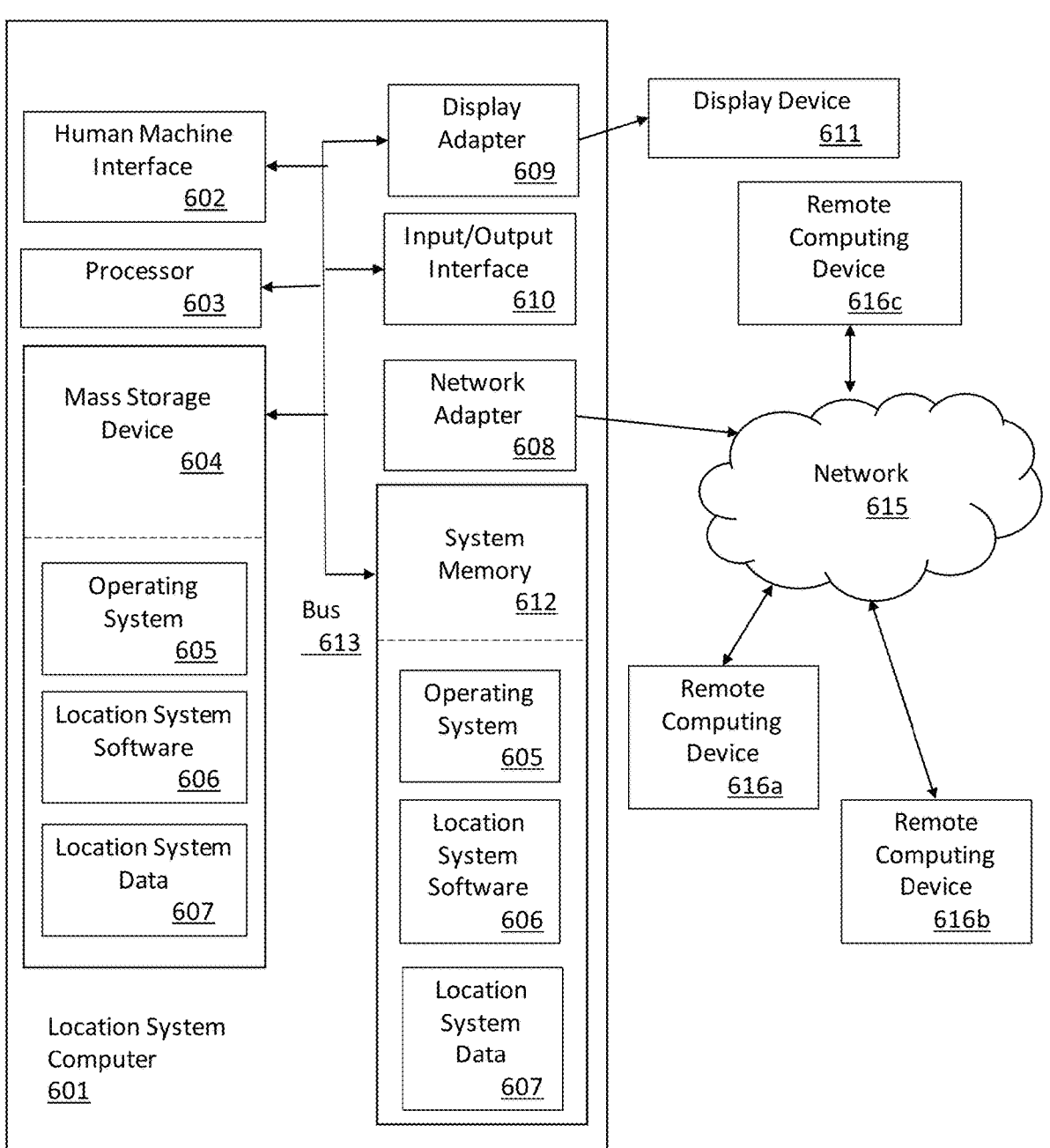
FIG. 6 is a block diagram of a computer according to an aspect of the present disclosure.

FIG. 6 is a block diagram illustrating an exemplary operating environment for performing at least a portion of disclosed methods according to an embodiment of the present invention. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

Further, one skilled in the art will appreciate that the systems and methods disclosed herein can utilize a specialized computing device in the form of a location system computer 601 (which may be included in, for example location system 100). The methods discussed above can be performed by the computer 601. For example, the computer 601 can perform the duties and responsibilities discussed above.

The components of the location system computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, location system software 606, location system data 607, a network adapter 608, system memory 612, an Input/Output Interface 610, a display adapter 609, a display device 611, and a human machine interface 602, can be contained within one or more remote computing devices 614 a,b,c at physically separate locations, connected through buses of this form, in effect implementing a fully distributed system.

The location system computer 601 typically comprises a variety of computer readable media. Exemplary readable media can be any available media that is accessible by the location system computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as location system data 607 and/or program modules such as operating system 605 and location system software 606 (i.e., modules and the like that perform the methods discussed above) that are immediately accessible to and/or are presently operated on by the processing unit 603.

In another aspect, the location system computer 601 can also comprise other removable/non-removable, volatile/non-volatile computer storage media. By way of example, FIG. 11 illustrates a mass storage device 604, which can provide non-volatile storage of computer code, computer readable instructions, data structures, program modules, and other data for the location system computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like.

Optionally, any number of program modules can be stored on the mass storage device 604, including by way of example, an operating system 605 and location system software 606. Each of the operating system 605 and location system software 606 (or some combination thereof) can comprise elements of the programming and the location system software 606. location system data 607 can also be stored on the mass storage device 604. location system data 607 can be stored in any of one or more databases known in the art. Examples of such databases include DB2®, Microsoft® Access, Microsoft® SQL Server, Oracle®, mySQL, PostgreSQL, and the like. The databases can be centralized or distributed across multiple systems. In other aspects, the location system data 607 can be stored on the mass storage device 605 of other servers or devices (e.g., remote computing device 614 *a,b,c,*) in communication with the location system computer 601.

In another aspect, the user can enter commands and information into the location system computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the location system computer 601 can have more than one display adapter 609 and more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like.

The location system computer 601 can operate in a networked environment using logical connections to one or more remote computing devices 614 *a, b, c*. By way of example, a remote computing device can be a personal computer, a laptop computer, portable computer, a server, a router, a network computer, a peer device or other common network node, and so on. Logical connections between the location system computer 601 and a remote computing device 614 *a, b, c* can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and a network 615 such as the internet 615.

For purposes of illustration, application programs and other executable program components such as the operating system 605 are illustrated herein as discrete blocks, although it is recognized that such programs and components reside at various times in different storage components of the location system computer 601, and are executed by the data processor(s) of the computer. An implementation of location system software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing circuits described herein may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. In the embodiments described herein, the illustrated examples may be implemented as circuitry located on a single integrated circuit or within a same device. Alternatively, the examples may be implemented as any number of separate integrated circuits or separate devices interconnected with each other in a suitable manner.

Figure 7:
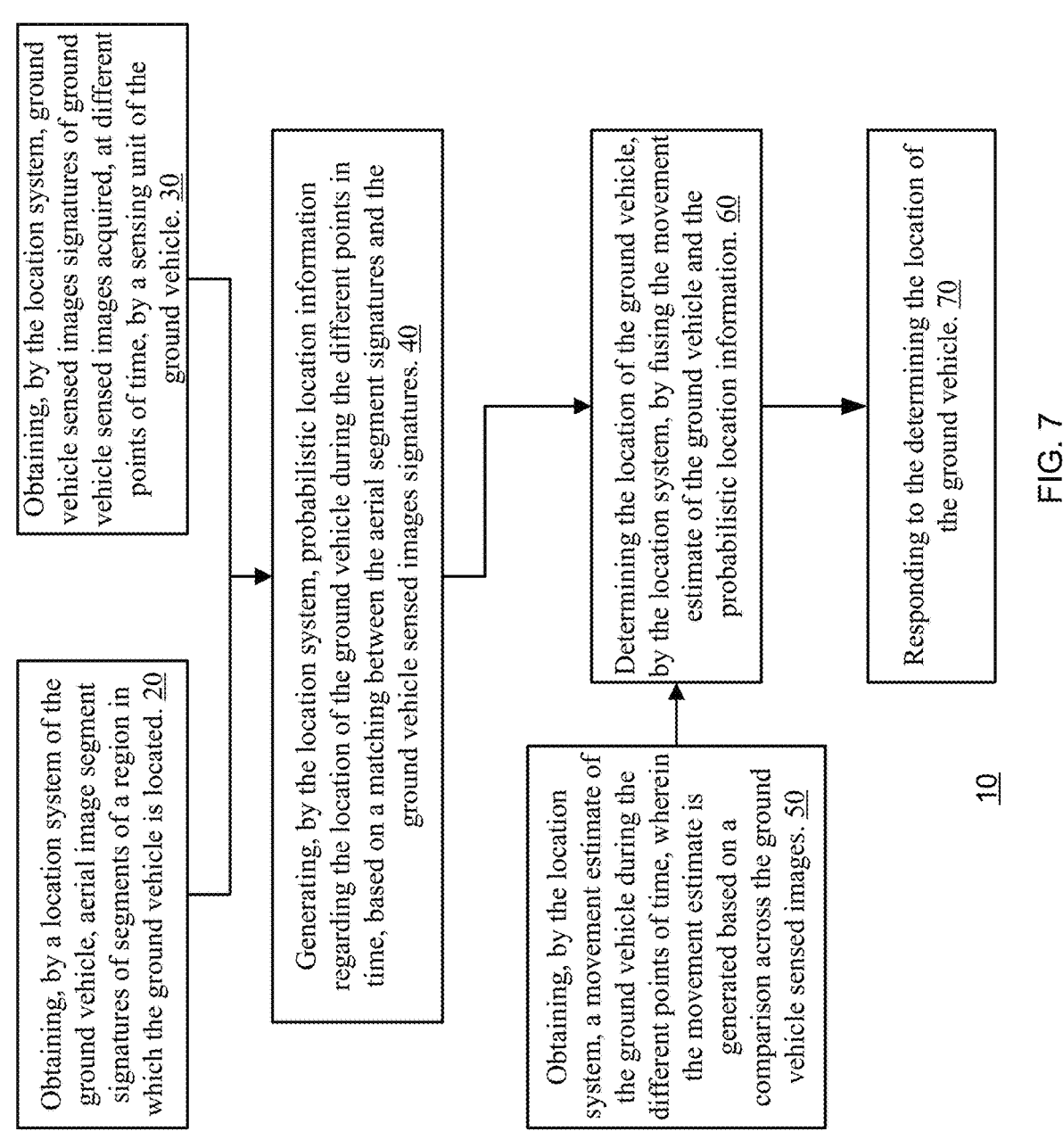
FIG. 7 illustrates an example of a method.

FIG. 7 illustrates an example of a method 10 for determining a location of a ground vehicle.

According to an embodiment, method 10 includes steps 20 and 30.

According to an embodiment, step 20 includes obtaining, by a location system of the ground vehicle, aerial image segment signatures of segments of a region in which the ground vehicle is located.

According to an embodiment, the ground vehicle sensed images are 360-degree ground vehicle sensed images. In this case, each ground vehicle sensed image covers a 360-degree sample of the environment of the ground vehicle.

According to an embodiment, the ground vehicle sensed images cover less than 360 degrees. A broader coverage may increase the accuracy of the location detection—but a lower coverage may be less costly to sense.

The required coverage may be determined in advance or in a dynamic manner. For example—assuming that the ground vehicle is located in an urban area or another area that exhibits a high density of objects—then the coverage may be reduced. On the other hand—assuming that the ground vehicle is located in a desolate area—or other area with sparse objects—then the coverage may be increased. The amendment of the coverage may be assisted by coarse location information of the ground vehicle—such as a global positioning satellite (GPS) location information, cellular cell location information, and the like.

According to an embodiment, a ground vehicle sensed image is generated by acquiring (in close timing proximity—for example within a fraction of a second) a plurality of ground vehicle sensed images of different angular segments—and stitching or otherwise combining the visual information to provide a 360-degree ground vehicle sensed images. The plurality of ground vehicle sensed images of different angular segments may be acquired by different image sensors of different fields of views (differ by at least by their polar angle coverage), and/or may be acquired by scanning the environment of the ground vehicle—for example using movable image sensors or image sensors preceded by optics of an adjustable field of view.

According to an embodiment, method 10 includes step 30 of obtaining, by the location system, ground vehicle sensed images signatures of ground vehicle sensed images acquired, at different points of time, by a sensing unit of the ground vehicle.

According to an embodiment, steps 20 and 30 are followed by step 40 of generating, by the location system, probabilistic location information regarding the location of the ground vehicle during the different points in time, based on a matching between the aerial segment signatures and the ground vehicle sensed images signatures.

According to an embodiment, the generating of the probabilistic location information comprises applying a random sample consensus process.

According to an embodiment, the probabilistic location information is provided per pixel (is a pixelwise—or per a group of pixels of any number of pixels.

According to an embodiment, the probabilistic location information is a heatmap. A color of a heatmap pixel is indicative of a probability that the vehicle is located at the heatmap pixel.

According to an embodiment, method 10 includes step 50 of obtaining, by the location system, a movement estimate of the ground vehicle during the different points of time, wherein the movement estimate is generated based on a comparison across the ground vehicle sensed images.

According to an embodiment, steps 40 and 50 are followed by step 60 of determining the location of the ground vehicle, by the location system, by fusing the movement estimate of the ground vehicle and the probabilistic location information.

According to an embodiment, step 60 includes processing the aerial image segment signatures with the vehicle sensed images signatures, by fusing the obtained movement estimate of the vehicle with the probabilistic location information, for determining the location of the vehicle.

According to an embodiment, step 60 is also responsive to motion information gained from non-image sensors of the ground vehicle. This motion information may be obtained by at least one sensor such as a vehicle direction or propagation sensor (determining the direction of propagation of the vehicle), an accelerometer, and the like.

According to an embodiment, step 60 may be based solely on the movement estimate of the ground vehicle, the probabilistic location information and coarse ground vehicle location information.

According to an embodiment, step 60 may be based solely on the movement estimate of the ground vehicle, the probabilistic location information and motion information gained from non-image sensors of the ground vehicle.

According to an embodiment, step 60 may be based solely on the movement estimate of the ground vehicle, the probabilistic location information, motion information gained from non-image sensors of the ground vehicle and coarse ground vehicle location information.

According to an embodiment step 60 determines the location information at a sub-path resolution. This is done, for example, in one of several ways, like fusing the neigh-bors of a patch to indicate where inside this patch the probability is the highest and/or using an up-sampled version of the aerial image.

A region of the aerial image may be of any shape and/or size and/or may have an area that ranges between 0.1 till 20 percent of an overall size of the area covered by the aerial image.

According to an embodiment, the fusing is executed by a machine learning process that undergone a training process.

According to an embodiment, the training process included feeding the machine learning process with ground vehicle sensed images and corresponding aerial images and inducing the machine learning process to (i) provide a similar signature to a ground vehicle sensed image of a region and an aerial image segment signature of that region, and (ii) provide dissimilar signatures to a ground vehicle sensed image and an aerial image segment of different regions.

According to an embodiment, the machine learning process exhibits a transformer architecture and the including includes applying an attention mechanism.

According to an embodiment, a signature of a region (being a ground vehicle sensed image or an aerial image) includes information regarding one or more other regions of the image.

According to an embodiment, the signatures of the segment or the patch is generated by applying self-attention mechanism—that computes attention scored between patches—based (for example, on content and position in the image.

According to an embodiment, the training process included feeding the machine learning process with ground vehicle sensed image signatures sensed at different point in time and corresponding aerial image segment signatures and causing the machine learning process to provide a mapping between the ground vehicle sensed image signatures and the aerial image segment signatures.

According to an embodiment, step 60 is followed by step 70 of responding to the determining the location of the ground vehicle.

Step 70 may include at least one of:

Triggering a determination of an at least partially autonomous driving operation. According to an embodiment, the at least partially autonomous driving operation is a fully autonomous driving operation or is only a partially autonomous driving operation such as an ADAS driving operation. According to an embodiment, the at least partially autonomous driving operation includes at least one of autonomously controlling a speed and/or direction of propagation and/or acceleration of a vehicle. According to an embodiment, the at least partially autonomous driving operation is selected out of an emergency breaking, a lane maintaining driving operation, and the like.

Determining of an at least partially autonomous driving operation.

Executing an at least partially autonomous driving operation.

There is provided a method for determining a location of a vehicle, the method includes: (i) obtaining, by a location circuit of the vehicle, aerial image segment signatures of segments of a region in which the vehicle is located; (ii) obtaining, by the location circuit, vehicle sensed images signatures of vehicle sensed images acquired, at different points of time, by a sensing unit of the vehicle; (iii) generating, by the location circuit, probabilistic location information regarding the location of the vehicle during the different points in time, based on a matching between the aerial segment signatures and the vehicle sensed images signatures; (iv) obtaining, by the location circuit, a movement estimate of the vehicle during the different points of time, wherein the movement estimate is generated based on a comparison across the vehicle sensed images; and (iv) processing the aerial image segment signatures with the vehicle sensed images signatures, by fusing the obtained movement estimate of the vehicle with the probabilistic location information, for determining the location of the vehicle.

According to an embodiment, the vehicle sensed images are 360-degree vehicle sensed images.

According to an embodiment, the generating of the probabilistic location information includes applying a random sample consensus process.

According to an embodiment, the determining the location of the vehicle further is also responsive to motion information gained from non-image sensors of the vehicle.

According to an embodiment, the obtaining of the aerial image segment signatures of segments of the region in which the vehicle is located is based on coarse vehicle location information.

According to an embodiment, the coarse vehicle location information is a global positioning system (GPS) vehicle location information.

According to an embodiment, the determining of the location of the vehicle is based solely on the movement estimate of the vehicle and the probabilistic location information.

According to an embodiment, the determining of the location of the vehicle is based solely on the movement estimate of the vehicle, the probabilistic location information and coarse vehicle location information.

According to an embodiment, the determining the location of the vehicle includes applying a Kalman filter on the movement estimate of the vehicle and on the probabilistic location information.

According to an embodiment, the determining the location of the vehicle includes applying a particle filter on the movement estimate of the vehicle and on the probabilistic location information.

According to an embodiment, the probabilistic location information is a heatmap.

According to an embodiment, the method includes sensing the vehicle sensed images by the sensing unit of the vehicle and generating the vehicle sensed images signatures.

There is provided a non-transitory computer readable medium for determining a location of a vehicle, the non-transitory computer readable medium stores instructions that once executed by a location system of the vehicle cause the location system to: (i) obtain aerial image segment signatures of segments of a region in which the vehicle is located; (ii) obtain vehicle sensed images signatures of vehicle sensed images acquired, at different points of time, by a sensing unit of the vehicle; (iii) generate probabilistic location information regarding the location of the vehicle during the different points in time, based on a matching between the aerial segment signatures and the vehicle sensed images signatures; (iv) obtain a movement estimate of the vehicle during the different points of time, wherein the movement estimate is generated based on a comparison across the vehicle sensed images; and (iv) process the aerial image segment signatures with the vehicle sensed images signatures, by fusing the obtained movement estimate of the vehicle with the probabilistic location information, for determining the location of the vehicle.

Because some aspects of the illustrated embodiments of the present disclosure may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any combination of any steps of any method illustrated in the specification and/or drawings may be provided. Any combination of any subject matter of any of claims may be provided. Any combinations of systems, units, components, processors, sensors, illustrated in the specification and/or drawings may be provided. Any combination of any module or unit listed in any of the figures, any part of the specification and/or any claims may be provided.

Any reference in the specification to a method should be applied mutatis mutandis to a device or system capable of executing the method and/or to a non-transitory computer readable medium that stores instructions for executing the method. Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

In the foregoing specification, the invention has been described with reference to specific examples of embodiments of the invention. It will, however, be evident that various modifications and changes may be made therein without departing from the broader spirit and scope of the invention as set forth in the appended claims. The specifications and drawings are, accordingly, to be regarded in an illustrative rather than in a restrictive sense.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Thus, the scope of the embodiments of the disclosure is defined by the appended claims and equivalents thereof. While certain features of the disclosure have been illustrated and described herein, many modifications, substitutions, changes, and equivalents will now occur to those of ordinary skill in the art. It is therefore to be understood that the appended claims are intended to cover all such modifications and changes as fall within the true spirit of the invention.

We claim:

1. A method that is computer implemented and is for determining a location of a vehicle comprising:

obtaining, by a processor, a plurality of aerial image segment signatures of segments of a region including the vehicle;

obtaining, by the processor, a plurality of vehicle sensed image signatures associated with the region including the vehicle while the vehicle is in motion;

matching, by the processor, a selected aerial image segment signature of the plurality of aerial image segment signatures to a selected sensed image signature of the plurality of sensed image signatures;

based on the matching step, generating, by the processor, probabilistic location information regarding the location of the vehicle; the probabilistic location information provides, per each position of multiple positions within the region, a probability that the vehicle is located at the position;

generating, by the processor, a movement estimate of the vehicle, wherein the movement estimate is generated based on a vehicle location comparison across a plurality of vehicle sensed images, wherein the plurality of vehicle sensed images are captured at a plurality of time intervals; and determining, by the processor, the location of the vehicle by combining the movement estimate of the vehicle and the probabilistic location information.

2. The method according to claim 1, wherein obtaining the plurality of aerial image segment signatures comprises generating the plurality of aerial image segment signatures by the processor.

3. The method according to claim 1, wherein obtaining the plurality of sensed image signatures comprises generating the plurality of sensed image signatures by the processor.

4. The method according to claim 1, wherein the vehicle sensed images are 360-degree vehicle sensed images.

5. The method according to claim 1, wherein the generating of the probabilistic location information comprises applying a random sample consensus process.

6. The method according to claim 1, wherein the determining of the location of the vehicle is also responsive to motion information gained from non-image sensors of the vehicle.

7. The method according to claim 1, wherein the determining of the location of the vehicle is based on a combination of the movement estimate of the vehicle, the probabilistic location information, and coarse vehicle location information.

8. The method according to claim 1, wherein the probabilistic location information is a heatmap.

9. The method according to claim 8, wherein the plurality of vehicle sensed images are associated with a plurality of heatmaps.

10. The method according to claim 1, wherein the obtaining of the plurality of the aerial image segment signatures and the obtaining of the plurality of sensed image signatures associated with the region including the vehicle comprises feeding to a machine learning process, the segments of the region including the vehicle and the sensed image signatures associated with the region including the vehicle; wherein the machine learning process being trained to (i) provide a similar signature to a ground vehicle sensed image of a region and an aerial image segment signature of that region, and (ii) provide dissimilar signatures to a ground vehicle sensed image and an aerial image segment of different regions.

11. The method according to claim 1, wherein the probabilistic location information provides the probability that the vehicle is located at the position per each of the plurality vehicle sensed images.

12. A non-transitory computer readable medium for determining a location of a vehicle, the non-transitory computer readable medium stores instructions that once executed by a location system of the vehicle cause the location system to:

obtain a plurality of aerial image segment signatures of segments of a region including the vehicle;

obtain a plurality of vehicle sensed image signatures associated with the region including the vehicle, while the vehicle is in motion;

match a selected aerial image segment signature of the plurality of aerial image segment signatures to a selected sensed image signature of the plurality of sensed image signatures;

based on the matching step, generate probabilistic location information regarding the location of the vehicle;

the probabilistic location information provides, per each position of multiple positions within the region, a probability that the vehicle is located at the position;

generate a movement estimate of the vehicles, wherein the movement estimate is generated based on a vehicle location comparison across a plurality of vehicle sensed images, wherein the plurality of vehicle sensed images are captured at a plurality of time intervals; and determine the location of the vehicle by combining the movement estimate of the vehicle and the probabilistic location information.

13. The non-transitory computer readable medium according to claim 12, wherein obtaining the plurality of aerial image segment signatures comprises generating the plurality of aerial image segment signatures.

14. The non-transitory computer readable medium according to claim 12, wherein obtaining the plurality of sensed image signatures comprises generating the plurality of sensed image signatures by the processor.

15. The non-transitory computer readable medium according to claim 12, wherein each of the plurality of sensed images is a 360-degree vehicle sensed image.

16. The non-transitory computer readable medium according to claim 12, wherein the generating of the probabilistic location information comprises applying a random sample consensus process.

17. The non-transitory computer readable medium according to claim 12, wherein the determining the location of the vehicle further is responsive to motion information gained from non-image sensors of the vehicle.

18. The non-transitory computer readable medium according to claim 12, wherein the determining of the location of the vehicle is based only on a combination of the movement estimate of the vehicle, the probabilistic location information, and coarse vehicle location information.

19. The non-transitory computer readable medium according to claim 12, wherein the determining of the location of the vehicle is based only on a combination of the movement estimate of the vehicle and the probabilistic location information.

20. The non-transitory computer readable medium according to claim 12, wherein the probabilistic location information is a heatmap.

21. A location system of a vehicle, the location system comprising:

one or more processing circuits that comprise at least a part of an integrated circuit, the one or more processing circuits are configured to:

obtain a plurality of aerial image segment signatures of segments of a region including the vehicle;

obtain a plurality of vehicle sensed image signatures associated with the region including the vehicle, while the vehicle is in motion;

match a selected aerial image segment signature of the plurality of aerial image segment signatures to a selected sensed image signature of the plurality of sensed image signatures;

based on the matching step, generate probabilistic location information regarding the location of the vehicle; the probabilistic location information provides, per each position of multiple positions within the region, a probability that the vehicle is located at the position;

generate a movement estimate of the vehicles, wherein the movement estimate is generated based on a vehicle location comparison across a plurality of vehicle sensed images, wherein the plurality of vehicle sensed images are captured at a plurality of time intervals; and determine the location of the vehicle by combining the movement estimate of the vehicle and the probabilistic location information.

22. The location system according to claim 21, wherein obtaining the plurality of aerial image segment signatures comprises generating the plurality of aerial image segment signatures.

23. The location system according to claim 21, wherein obtaining the plurality of sensed image signatures comprises generating the plurality of sensed image signatures by the processor.

* * * * *